United States Patent [19]

Imahashi et al.

[11] Patent Number: 4,863,679
[45] Date of Patent: Sep. 5, 1989

[54] CLADDING TUBE FOR NUCLEAR FUEL AND NUCLEAR FUEL ELEMENT HAVING THIS CLADDING TUBE

[75] Inventors: Hiromichi Imahashi, Hitachi; Toshio Kubo, Mito; Kazumi Asahi, Mito; Hideyuki Mukai, Mito; Keizo Ogata, Mito, all of Japan

[73] Assignee: Hitachi, Ltd., Tokyo, Japan

[21] Appl. No.: 59,175

[22] Filed: Jun. 12, 1987

Related U.S. Application Data

[63] Continuation of Ser. No. 709,402, Mar. 7, 1985, abandoned.

[30] Foreign Application Priority Data

Mar. 9, 1984 [JP] Japan .................... 59-46299
Mar. 9, 1984 [JP] Japan .................... 59-46300
Mar. 9, 1984 [JP] Japan .................... 59-46302

[51] Int. Cl.$^4$ .................... G21C 3/20; G21C 3/06
[52] U.S. Cl. .................... 376/417; 376/416; 376/457; 420/422
[58] Field of Search ............ 376/414, 416, 417, 457; 420/422

[56] References Cited

U.S. PATENT DOCUMENTS

| | | | |
|---|---|---|---|
| 3,957,507 | 5/1976 | Blumenthal | 420/422 |
| 4,000,013 | 12/1976 | MacEwen et al. | 420/422 X |
| 4,200,492 | 4/1980 | Armijo et al. | |
| 4,238,251 | 12/1980 | Williams et al. | 376/457 X |
| 4,284,660 | 8/1981 | Donaghy et al. | 376/417 X |
| 4,343,659 | 8/1982 | Murakami et al. | 376/416 X |
| 4,659,540 | 4/1987 | Cheng et al. | 376/417 |

FOREIGN PATENT DOCUMENTS

| | | | |
|---|---|---|---|
| 0155603 | 9/1985 | European Pat. Off. | 376/416 |
| 3504031 | 9/1985 | Fed. Rep. of Germany | 420/422 |
| 0134552 | 8/1982 | Japan | 420/422 |

Primary Examiner—John S. Maples
Attorney, Agent, or Firm—Antonelli, Terry & Wands

[57] ABSTRACT

Disclosed are a cladding tube for a nuclear fuel and a nuclear fuel element incorporating the cladding tube. The cladding tube consists of an inner zirconium liner layer and an outer zirconium alloy layer. The cladding tube has at least one of the following features: (I) the ratio a/b of the oxygen content a to iron content b in the zirconium liner layer is greater than 1.0, (II) the zirconium liner layer is made of a zirconium into the matrix of which impurities are dissolved, and (III) the second phase particles having microscopic sizes and dispersed in the inner surface of the zirconium liner layer and/or the outer surface of the zirconium alloy layer have been removed substantially. Owing to these features, undesirable stress corrosion cracking and local corrosion are remarkably suppressed in the cladding tube and the nuclear fuel element of the invention.

21 Claims, 15 Drawing Sheets

1μm

1μm

1μm

1μm

F I G. 15
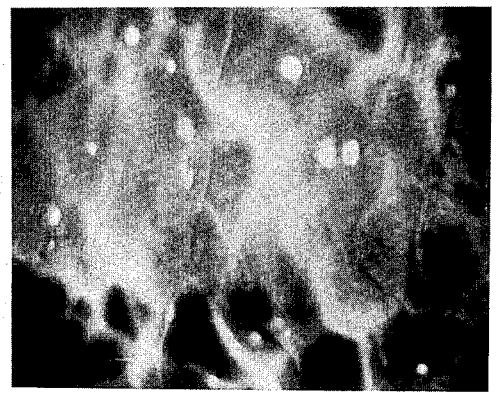
1μm
F I G. 16
1μm

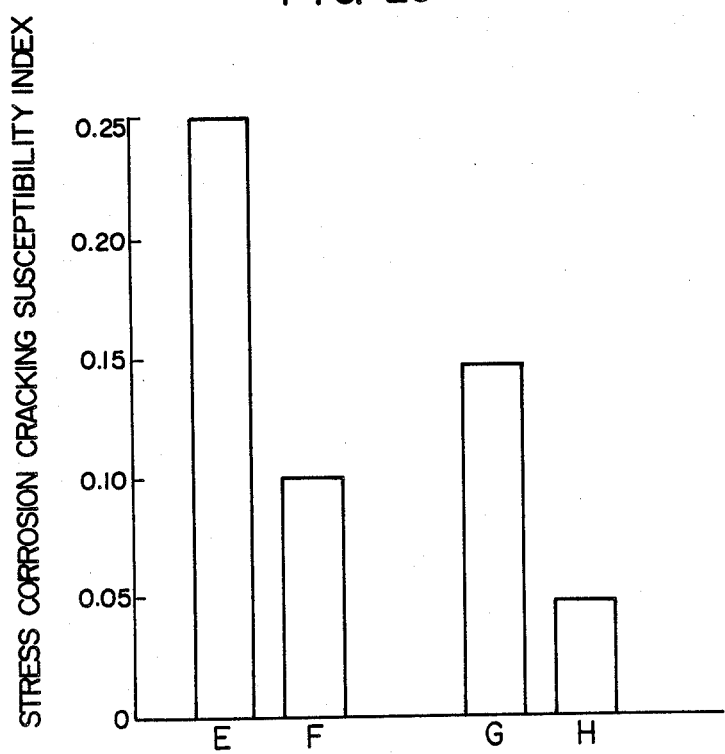

CLADDING TUBE FOR NUCLEAR FUEL AND NUCLEAR FUEL ELEMENT HAVING THIS CLADDING TUBE

This application is a continuation of application Ser. No. 709,402, filed Mar. 7, 1985, now abandoned.

BACKGROUND OF THE INVENTION

The present invention relates to a cladding tube for nuclear fuel used in a nuclear reactor and, more particularly, to a cladding tube made of a zirconium alloy lined on its inner surface with a zirconium liner. The invention is also concerned with a nuclear fuel element having the above-mentioned cladding tube.

A nuclear fuel element comprises a cladding tube accommodating therein a stack of a plurality of fuel pellets, which are formed by sintering an uranium oxide, thorium oxide, plutonium oxide or a compound thereof, and end plugs sealing both open ends of the cladding tube. Further, in an upper portion of the nuclear fuel element, there are provided a gas storage plenum and a spring for stably holding the fuel pellets.

In the nuclear fuel element having a construction as mentioned above, for the cladding tube such functions are required as to prevent mutual contact and chemical reaction of the fuel pellets with the coolant or moderator and to prevent contamination of the coolant by radioactive fission products emitted from the fuel pellets. Accordingly, the material of the cladding tube is required to have excellent mechanical properties and high corrosion resistance under the operating conditions in the nuclear reactor, as well as a small neutron absorption. From these points of view, zirconium alloys containing zirconium as the major component, such as Zircaloy material, are widely used as the material of the cladding tube. The zirconium alloys have a small neutron absorption cross section, and exhibit only a small reactivity with pure water or steam and suitable strength and ductility at temperatures below 400° C., and so they have excellent properties as a cladding material used under normal condition. However, from the operating experiences up to now it has become clear that at high degree of burn-up the cladding tube causes a stress corrosion cracking because of a synergetic effect of chemical reaction with corrosive fission products (iodine, etc.) and stress caused in the cladding tube by thermal expansion of the fuel pellets. In addition, the outer surface of the cladding tube is locally oxidized by the coolant or moderator of the nuclear reactor.

In order to prevent the aforesaid stress corrosion cracking of cladding tube, a so-called zirconium-lined cladding tube has been developed, in which the cladding tube is lined on its inner surface with a zirconium liner. The zirconium liner is expected to prevent stress corrosion cracking by eliminating contact between the cladding tube and the corrosive fission products and by relieving local stress caused by thermal expansion of the fuel pellets. Thus, the zirconium liner is required to have a high resistance to corrosive fission products and a high ductility to relieve effectively any local stress.

In general, zirconium is less sensitive to the stress corrosion cracking in comparison with zirconium alloys and has high ductility and small neutron absorption cross section, and so it has excellent properties as the liner material.

SUMMARY OF THE INVENTION

Accordingly, a first object of the invention is to enhance the stress corrosion cracking resistance of a zirconium liner which lines the inner surface of the cladding tube for a nuclear fuel.

A second object of the invention is to reduce the unfavorable effect of impurities contained in the zirconium liner on the stress corrosion cracking resistance.

A third object of the invention is to prevent local corrosion of the outer surface of a cladding tube due to reaction of the cladding tube material with the coolant or moderator.

A fourth object of the invention is to provide a nuclear fuel element having a cladding tube which is improved to achieve the above-mentioned first to third objects and thus has an enhanced reliability over a long period of use.

The present inventors have made an intensive study and carried out various experiments to achieve these objects, and found that these objects can be attained by the following measures I to III and, as a result, attained the invention:

I. To reduce the stress corrosion cracking susceptibility of a zirconium liner by limiting the total content of impurities to a level not greater than 5,000 ppm and maintaining the ratio a/b of the oxygen content a (ppm) to iron content b (ppm) greater than 1.0, paying specific attention to oxygen and iron among all impurities contained in the zirconium liner.

II. To reduce the stress corrosion cracking susceptibility of a zirconium liner by beforehand dissolving the impurities contained in the zirconium liner into the zirconium matrix, especially the impurities liable to form precipitates (referred to as "second phase particles", hereinunder) which are intermetallic compounds with zirconium.

III. To remove the second phase particles of compounds containing Fe, Cr, Ni, Sn and so forth, which are dispersed on the inner and/or the outer surface of the zirconium-lined cladding tube.

By combining the measure I with the measure II and by combining the measure I with the measure III, it is possible to achieve the objects of the invention more effectively.

BRIEF DESCRIPTION OF THE DRAWINGS

FIG. 15 is a photomicrograph by scanning electron microscope, of an outer surface of a cladding tube made of Zircaloy-2 after being pickled for 20 seconds;

FIG. 16 is a photomicrograph by scanning electron microscope, of an outer surface of a cladding tube made of Zircaloy-2 after being pickled for 2 minutes;

FIG. 20 is a chart showing stress corrosion cracking susceptibility indices of zirconium.

DETAILED DESCRIPTION OF THE INVENTION

The invention is described in detail hereinunder with reference to the accompanying drawings.

Figure 1:
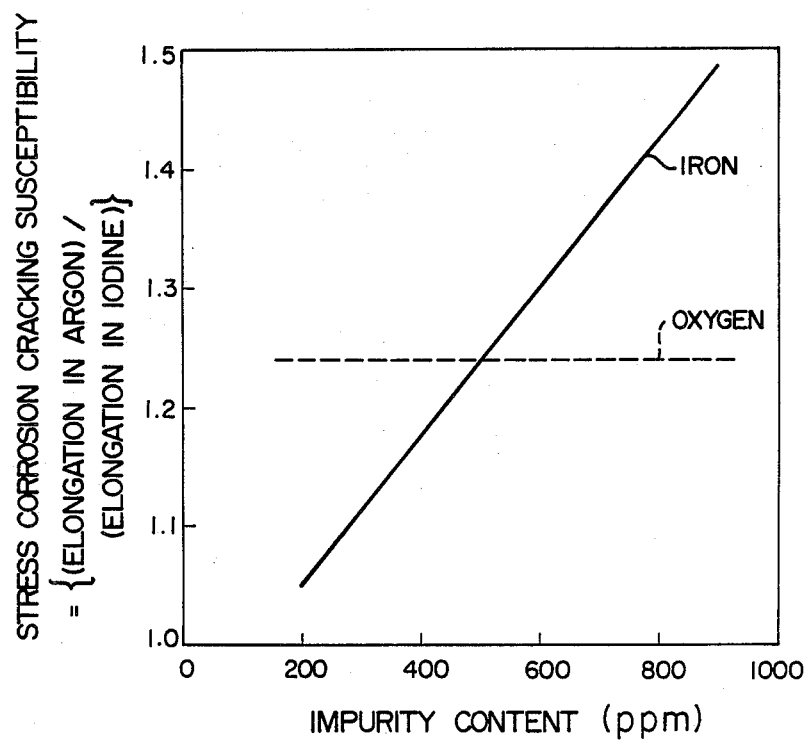
FIGS. 1 and 2 are charts showing the relationship between the stress corrosion cracking susceptibility and impurity content.
Figure 2:
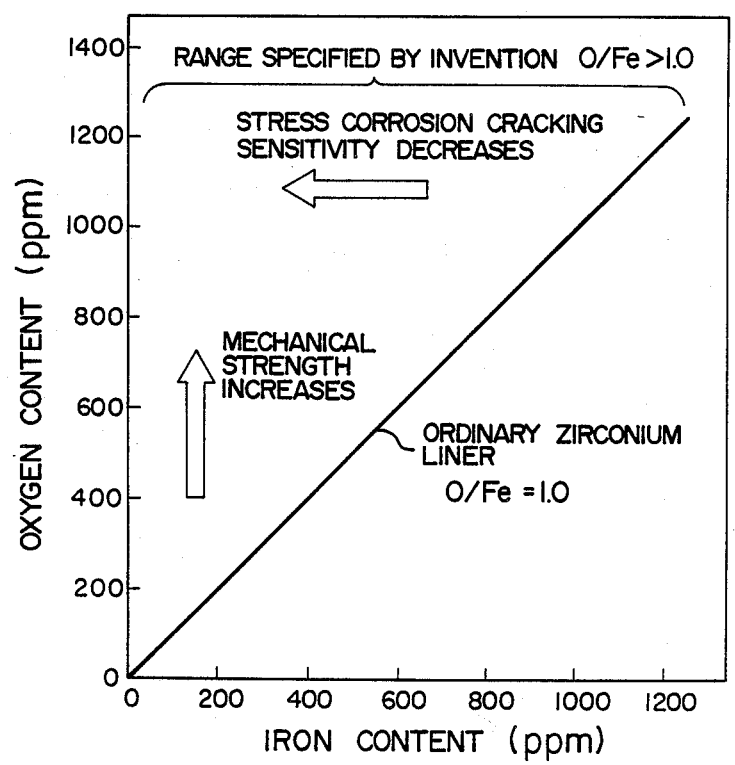
Figure 4:
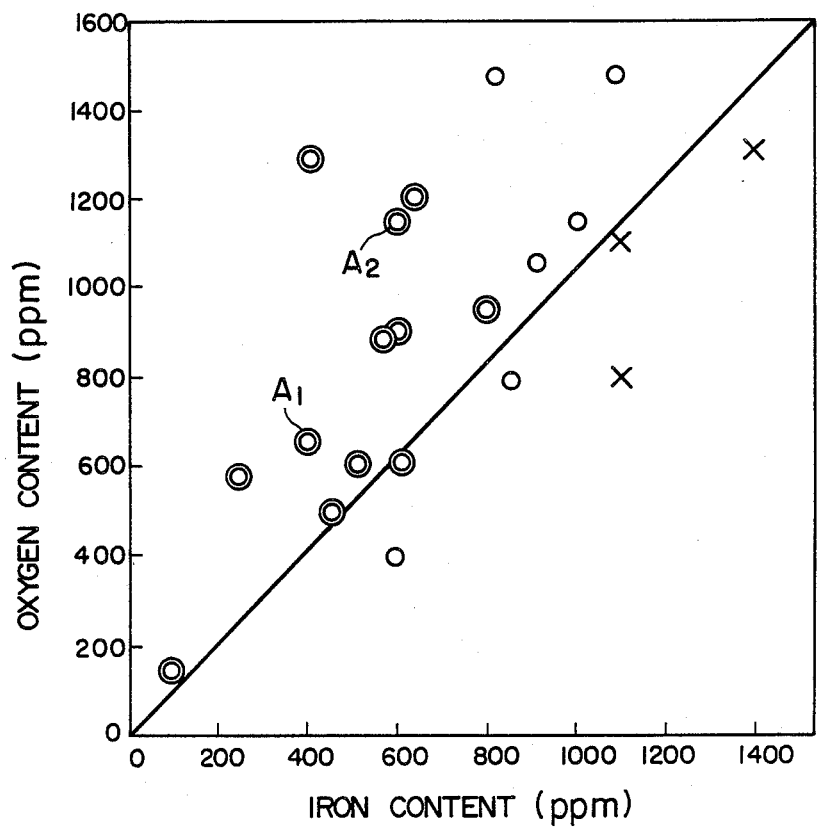
FIG. 4 is a chart showing the relationship between iron and oxygen contents and stress corrosion cracking susceptibility.

Firstly, the description is made as to the aforementioned measure I. As explained already, it has become clear that zirconium is less liable to cause the stress corrosion cracking in comparison with zirconium alloys. However, it becomes liable to cause the stress corrosion cracking with increase in contents of impurities such as oxygen, iron, etc. Hitherto, it has been believed that the oxygen content is an important factor because among the impurities the oxygen enhances the mechanical strength of zirconium, and a technical thought of suppressing the oxygen content below a certain level is disclosed in Japanese Patent Publication No. 33037/80 [corresponding to U.S. patent application Ser. No. 522,856 (Nov. 11, 1974)] and Japanese Patent Application Laid-Open Publication No. 59600/79 (corresponding to U.S. Pat. No. 4,200,492). However, according to the results of experiments recently carried out by the present inventors, it became clear that the iron content was a more important factor than the oxygen content. FIG. 1 shows, from the results of the experiments recently carried out, the effects of oxygen content and iron content on the stress corrosion cracking susceptibility (that is, the liability to cause the stress corrosion cracking) of zirconium. The Figure shows that, while the oxygen content causes no remarkable effect, the stress corrosion cracking becomes liable to occur with increase in the iron content. By the way, as shown in FIG. 2, in the case of the zirconium liner in cladding tube commercially produced for nuclear fuel elements, the ratio a/b of the oxygen content a (ppm) to iron content b (ppm) was about 1.0. It became clear that the zirconium liner, whose ratio a/b was greater than 1.0, had excellent properties in both of stress corrosion cracking susceptibility and mechanical strength. FIG. 4 shows the results of experiments which concretely represent the content of FIG. 2. In the region wherein the ratio a/b is greater than 1.0, it is seen that the stress corrosion cracking susceptibility decreases with decrease in the iron content and the mechanical strength increases with increase in the oxygen content. Accordingly, even in the region wherein the ratio a/b is greater than 1.0, the zirconium liner with a smaller iron content and a larger oxygen content has the most preferable properties.

Presently, highly pure crystal bar zirconium with oxygen and iron contents less than 200 ppm, and sponge zirconium with oxygen and iron contents of about 500 to 1000 ppm, are considered as the material for the zirconium liners.

On the basis of the aforementioned knowledges, it became clear that the zirconium had the advantages and disadvantages mentioned below. Since the crystal bar zirconium has a low iron content, it has a low stress corrosion cracking susceptibility, but since it has a too small oxygen content, the solid solution strengthening owing to oxygen can not be obtained and so it has a small mechanical strength, and in addition it has a disadvantage that its price is too high. On the other hand, although the sponge zirconium is inferior in its stress corrosion cracking susceptibility to the crystal bar zirconium, it has advantages that owing to the high oxygen content it has higher mechanical strength than the crystal bar zirconium. In addition the sponge zirconium is more economical than the crystal zirconium.

On the basis of the results of experiments shown in FIG. 1, the present invention provides an economical zirconium liner material which has both of the stress corrosion cracking susceptibility equivalent to that of crystal bar zirconium and the mechanical strength equivalent to that of sponge zirconium, by making the ratio a/b of the oxygen content a to iron content b in the zirconium greater than 1.0. This can be achieved by reducing iron content in the sponge zirconium, or by adding oxygen to the crystal bar zirconium. That is, by lowering the iron content the stress corrosion cracking susceptibility is suppressed to a low level, and by containing oxygen of a suitable content the mechanical strength is maintained at a high level.

Preferable embodiments of the invention are described hereinunder.

Embodiment 1

Figure 3:
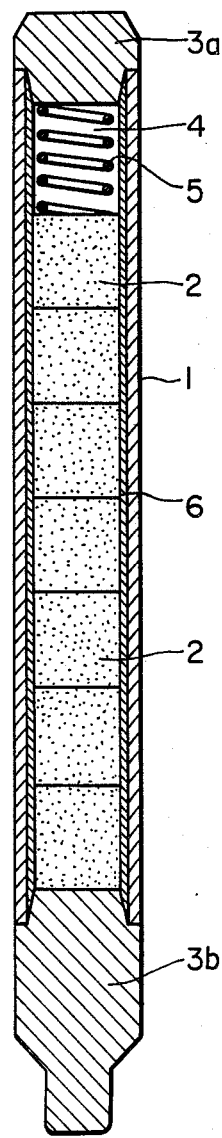
FIG. 3 is a vertical sectional view of a nuclear fuel element for an embodiment of the invention.

The nuclear fuel element of this embodiment comprises, as shown in FIG. 3, a cladding tube 1 accommodating therein a plurality of fuel pellets 2 and end plugs 3a and 3b sealing both ends of the cladding tube 1. In an upper portion of the nuclear fuel element, a gas plenum 4 is formed. A spring 5 for holding the fuel pellets 2 is provided in the gas plenum 4. A zirconium liner 6 is lined on an inner surface of the cladding tube 1 over its entire length. The zirconium liner 6 interposes between the cladding tube 1 and the fuel pellets 2. The cladding tube 1 is made of Zircaloy-2, whose composition is shown in Table 6 submitted later. The zirconium liner 6 is made of zirconium containing impurities, whose composition is shown at No. 1 in Table 1.

TABLE 1

| No. | O | Fe | Cr | Hf | Si | W | C | H | N |
|---|---|---|---|---|---|---|---|---|---|
| | | | | (Unit: ppm) | | | | | |
| 1 | 670 | 420 | 123 | 80 | 30 | <10 | <50 | 12 | 11 |
| 2 | 1040 | 610 | 117 | 70 | <30 | <10 | <50 | 13 | 22 |

Using the zirconium-lined cladding tube (having an inner zirconium liner 6 and an outer zirconium alloy layer 1) as a sample, stress corrosion cracking test was carried out by both of the uni-axial tensioning method and the expanding mandrel method in order to evaluate the performance of the liner. The test result of the zirconium-lined cladding tube in the nuclear fuel element of this embodiment is shown at $A_1$ in FIG. 4. The testing conditions are as follows:

iodine concentration: 0 to 20 torr.
  strain rate: $10^{-6}$ to $10^{-3}$ sec$^{-1}$.
  testing temperature: 350° C.

A cladding tube having a zirconium liner made of zirconium containing impurities, whose composition is shown at No. 2 in Table 1, was also tested under the same conditions as mentioned above. The result thereof is shown at $A_2$ in FIG. 4.

The mechanical properties of the zirconium liners made of zirconium containing impurities, whose compositions are shown at Nos. 1 and 2 in Table 1, are shown in Table 2.

TABLE 2

| No. | tensile strength (at room temp.) | 0.2% proof stress | elongation |
|---|---|---|---|
| 1 | 206 MPa | 207 MPa | 10% |
| 2 | 359 MPa | 295 MPa | 9% |

The same tests as mentioned above were made on 19(nineteen) kinds of zirconium liners having different iron and oxygen contents, besides two kinds shown in Table 1. The results thereof are also plotted in FIG. 4.

As shown in FIG. 4, the zirconium-lined cladding tube, wherein the ratio a/b of oxygen content a to iron content b in the zirconium liner 6 is greater than 1.0, has superior property.

The zirconium liner 6 having a reduced iron content is obtainable by means of classifying ingots produced by melting a sponge zirconium and using only the portions having small iron content. The iron content can be reduced also by removing iron by heating the ingot in a high vacuum atmosphere nearly to the melting point of iron, by making use of the fact that the melting point of iron is lower than that of zirconium. The use of sponge zirconium affords a greater economy as compared with the crystal bar zirconium.

Next, a description will be made hereinunder as to the aforementioned measure II.

The present inventors have found that the effectiveness against stress corrosion cracking produced by the zirconium liner is impaired as the amount of aforementioned second phase particles (precipitates of intermetallic compounds with zirconium) in the zirconium matrix is increased. Namely, when second phase particles of sizes above 0.1 μm are irregularly dispersed in the grain boundaries and within the grains under corrosive environment formed by iodine which is a fission product, the stress is concentrated around the second phase particles to promote the initiation and propagation of the cracks. Therefore, a higher stress relieving effect, which is one of the purposes of the provision of the zirconium liner, can be attained by reducing the amount of the second phase particles. This can be achieved by dissolving insoluble impurities already mentioned into the zirconium matrix.

Table 3 shows the maximum solubility limits and maximum dissolving temperature of the elements which form the second phase particles, as well as the compositions of the second phase particles. These elements are more or less contained in the zirconium which is a material used in nuclear reactors.

TABLE 3

| element | maximum solubility limit to Zr dissolving amount (wt %) | temp. (°C.) | secondary phase particles | remarks |
|---|---|---|---|---|
| Fe | 0.02 | 800 | Fe$_2$Zr | |
| Cr | trace | 835 | ZrCr$_2$ | |
| Si | 0.1 | 860 | Zr$_4$Si | |
| W | 0.5 | 860 | ZrW$_2$ | |
| Ni | trace | 808 | Zr$_2$Ni | |
| Al | 0.35 | 700 | Zr$_3$Al | at 940° C., dissolving amount of Al is 3.5% |
| C | trace | | ZrC | |

From Table 3, it will be seen that, among the impurity elements, Fe, Cr, Ni and C have very small solubility limits and, hence, are liable to form second phase particles. The elements Si, W and Al are generally contained in zirconium in small amounts, but they have a possibility of forming second phase particles when they are segregated in zirconium.

According to the invention, therefore, in order to re-dissolve the impurity elements into the zirconium matrix, the zirconium to be used as the liner is heat treated at temperatures around 800° C. or 860° C. near the phase transformation temperature (862° C.), and then rapidly cooled to room temperature, thereby uniformly re-dissolving the second phase particles. Further, in order to remove the strain caused by the solution heat treatment of the zirconium, a strain relief annealing is performed at such a low temperature range that the second phase particles are prevented from being re-precipitated.

It is preferable that the amount of second phase particles is as small as possible. However, a sufficient effectiveness is attained even when the impurities are not perfectly dissolved into the zirconium matrix, since the initiation probability of the stress corrosion decreases with a decrease of an amount of second phase particles. In fact, a satisfactory improving effect is obtained when the number of particles greater than about 0.1 μm among the materially observable second phase particles is reduced to less than 50% of that in the zirconium liner to which the present invention has not been applied.

Preferable embodiments of the invention will be described hereinunder.

Embodiment 2

Figure 5:
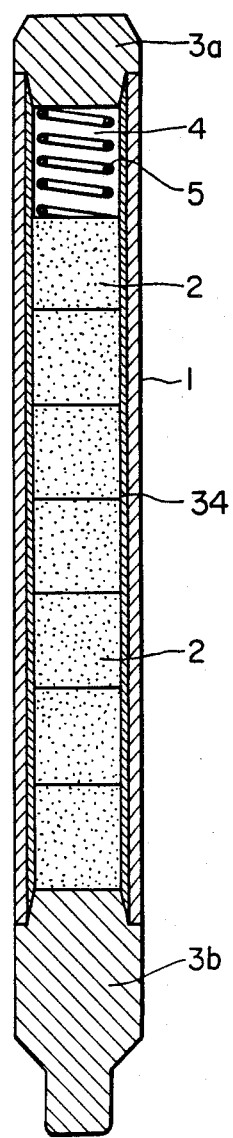
FIG. 5 is a vertical sectional view of a nuclear fuel element for another embodiment of the invention.

The nuclear fuel element of this embodiment is shown in FIG. 5, and is almost identical in its construction with that of the embodiment 1, except the zirconium liner 34. This zirconium liner 34 is made of zirconium containing the impurities, whose composition is shown at No. 1 in Table 4, which impurities have been dissolved into the zirconium matrix. The zirconium liner 34 shown in FIG. 5 may be made of zirconium containing the impurities, whose composition is shown at No. 2 or 3 in Table 4, which impurities also have been dissolved into the zirconium matrix.

Figure 6:
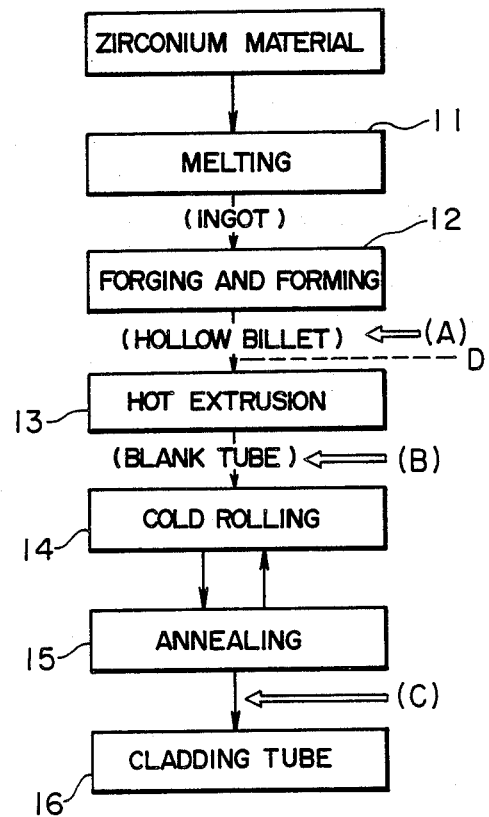
FIG. 6 is a flow chart showing the process for producing a zirconium-lined cladding tube.

FIG. 6 illustrates, by way of example, a flow chart for producing a cladding tube 1 having a zirconium liner 6. In a step 11, zirconium is melted and formed into an ingot. The ingot is then forged and formed in a step 12 to become a hollow billet. The hollow billet is inserted into another hollow billet which has been formed beforehand from a zirconium alloy such as Zircaloy-2 (point D). Two hollow billets thus assembled monolithically are subjected to a hot extrusion (step 13) and become a blank tube of zirconium-lined cladding tube. Thus, this blank tube is composed of an inner zirconium layer and an outer zirconium alloy layer. The blank tube is then subjected to repetitional cycles of treatment in which cold rolling (step 14) and annealing (step 15) are effected alternatingly for a predetermined number of cycles, and becomes the zirconium-lined cladding tube 1 (step 16). According to this embodiment, the following steps (A), (B) and (C) are added in the flow chart shown in FIG. 6.

(A) Solution heat treatment after formation of hollow zirconium billet.
(B) Solution heat treatment on the blank tube after the hot extrusion.
(C) Solution heat treatment after final annealing.

In the production of the nuclear fuel element according to this embodiment, the best result is obtained when all of the steps (A), (B) and (C) are applied. However, any one of the steps (A), (B) and (C) has sufficient effectiveness. In particular, it is effective to add the step (C). Impurities contained in the zirconium and shown in Table 3 can be almost dissolved into the zirconium matrix by improving any one of the steps (A), (B) and (C), or any combination of them.

The impurities contained in the zirconium are subjected to the solution heat treatment at the aforesaid step (C). That is, after the final annealing, the cladding tube thus obtained is heated in a vacuum atmosphere at 850° C. for 2 hours and then quenched to the room temperature. Further, the cladding tube is annealed in a vacuum atmosphere at 530° C. for 2 hours. In this way, a zirconium-lined cladding tube having the zirconium liner 6 into the matrix of which the impurities have been dissolved is obtained.

Using zirconium containing the impurities shown at Nos. 1, 2 and 3 in Table 4, three kinds of zirconium-lined cladding tubes, the impurities of which have been dissolved in compliance with the aforesaid flow chart, were produced, and they were subjected to the stress corrosion cracking tests by the expanding mandrel method. The testing conditions are as follows:

iodine concentration: 1 mg/cm$^2$.
strain rate: $1 \times 10^{-3}$ min$^{-1}$.
testing temperature: 350° C.

TABLE 4

| | (Unit: ppm) | | | | | | | |
|---|---|---|---|---|---|---|---|---|
| No. | Fe | Cr | Ni | Si | W | Al | C | O | N |
| 1 | 110 | <50 | <35 | <70 | <40 | <40 | 50 | 115 | 11 |
| 2 | 455 | 84 | <10 | <70 | <40 | 54 | 50 | 525 | 14 |
| 3 | 930 | 135 | 18 | <70 | <40 | 61 | 75 | 1060 | 17 |

Figure 7:
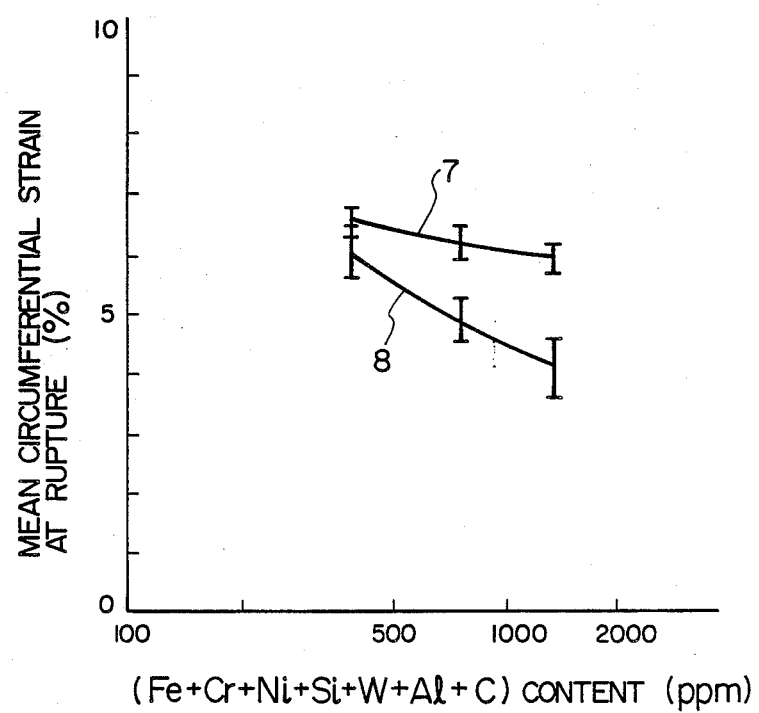
FIG. 7 is a chart showing the relationship between the impurity content and strain at rupture.

FIG. 7 shows the relationship between the mean circumferential stress at rupture of the cladding tube and the total contents of impurities, i.e., (Fe+Cr+Ni+Si+W+Al+C) content, contained in the zirconium. In this Figure, a curve 7 shows the property of the cladding tube of this embodiment, while a curve 8 shows the property of a conventional cladding tube, as obtained in the tests mentioned above. In both curves, although the strain at rupture is lowered as the total impurity content is increased, it is generally higher in all samples of this embodiment than in the samples of the conventional cladding tubes. This means that the cladding tube of this embodiment has lower susceptibility to stress corrosion cracking than the conventional cladding tubes.

Embodiment 3

The nuclear fuel element of this embodiment is identical in its construction with that shown in FIG. 5, except that the composition of impurities contained originally (i.e., before being dissolved into the zirconium matrix) in a blank material used for the zirconium liner 34 is different. A zirconium, which becomes a blank material of the zirconium liner in the nuclear fuel element of this embodiment, contained the impurities of the composition shown at No. 5 in Table 5, before being dissolved into the zirconium matrix. The zirconium liner in the nuclear fuel element of this embodiment is made of the zirconium into the matrix of which the impurities shown at above No. 5 have been dissolved. Such zirconium-lined cladding tube is produced in compliance with the aforementioned flow chart shown in FIG. 6, and the solution heat treatment is performed at the aforesaid step (C) similarly to the embodiment 2. This solution heat treatment is carried out by heating in a vacuum atmosphere the cladding tube obtained in the final annealing at 800° C. for 3 hours, and then quenching it to room temperature. Further, the cladding tube is annealed by being heated at 550° C. for 2 hours. Incidentally, the zirconium liner in the nuclear fuel element of this embodiment may be made of zirconium containing the impurities, whose composition is shown at No. 6 in Table 5, instead of the zirconium containing the impurities, whose composition is shown at No. 5 in Table 5. In this case, the solution heat treatment is performed at the same conditions as in the case where the zirconium containing the impurities, whose composition is shown at No. 5 in Table 5, is used.

TABLE 5

| | (Unit: ppm) | | | | | | | | |
|---|---|---|---|---|---|---|---|---|---|
| No. | Fe | Cr | Ni | Si | W | Al | C | O | N | H |
| 5 | 800 | 117 | <10 | <30 | <10 | 25 | <50 | 945 | 17 | 12 |
| 6 | 610 | 117 | <10 | <30 | <10 | 25 | <50 | 1140 | 22 | 13 |

In order to confirm the effect of the liner in the cladding tube of this embodiment, a stress corrosion cracking test was carried out by a uni-axial tensioning method in an iodine atmosphere, using zirconium plates having impurity contents shown at No. 5 in Table 5, under the following testing conditions:

(i) iodine concentration in testing atmosphere: 10 torr.
(ii) strain rate: about $10^{-5}$/sec.
(iii) testing temperature: 350° C.

From the above zirconium plates (having impurity contents shown at No. 5 in Table 5), three kinds of samples were prepared: namely, in FIG. 6, (1) sample obtained by being subjected to the steps till cold rolling, (2) sample obtained by being subjected to the steps till final annealing, and (3) sample obtained by being subjected to solution heat treatment following the final annealing. The solution heat treatment was made, similarly to that mentioned above, by heating in a vacuum atmosphere the zirconium plate obtained in the final annealing step at 800° C. for 3 hours and water-cooling it to the room temperature, and then annealing it at 550° C. for 2 hours.

Figure 8:
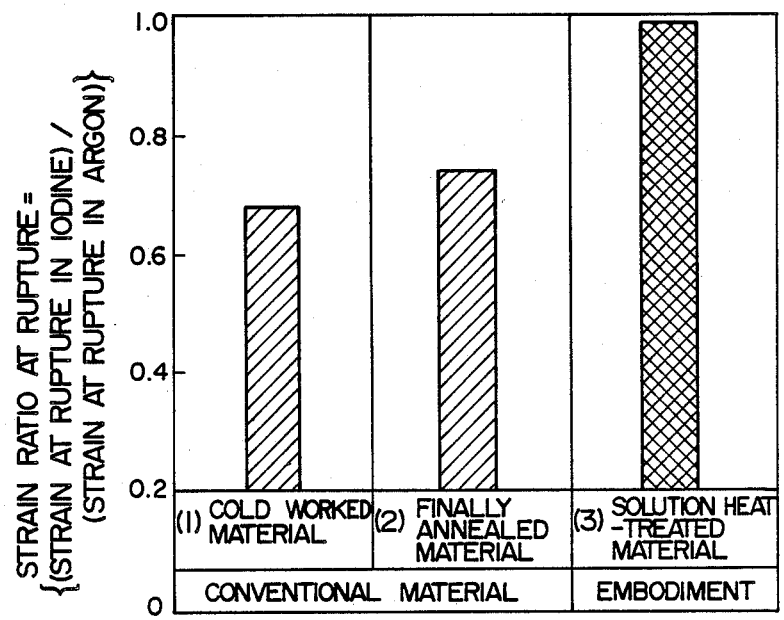
FIG. 8 is a chart showing how the strain ratio at rupture is improved by a solution heat treatment.

FIG. 8 shows the test results of the above-mentioned samples (1), (2) and (3), in terms of strain ratio at rupture (i.e., the ratio between the strain at rupture in iodine and the strain at rupture in argon). It will be seen that the material of this embodiment exhibits the highest strain ratio at rupture. That is, the material of this embodiment has an extremely low susceptibility to stress corrosion cracking.

Figure 9A:
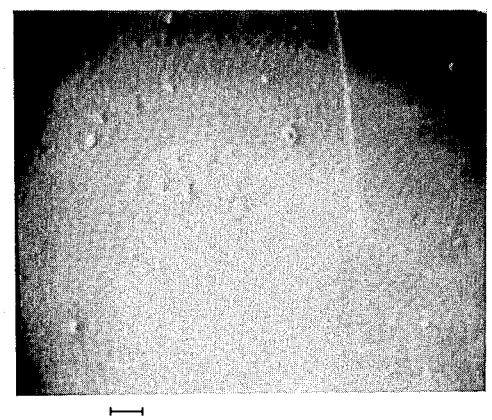
FIG. 9a is a photomicrograph by scanning electron microscope, of a surface of a sample before being subjected to a solution heat treatment.
Figure 9B:
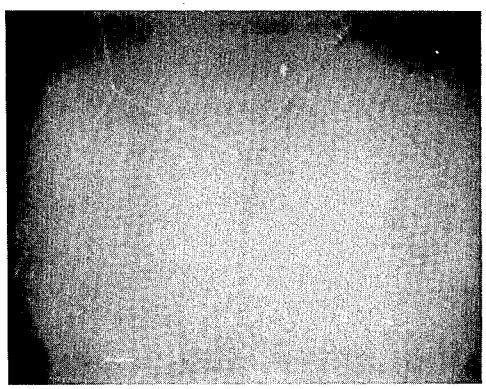
FIG. 9b is a photomicrograph by scanning electron microscope, of a surface of a sample after being subjected to a solution heat treatment.

FIG. 9 shows the photomicrographs by scanning electron microscope, of the above-mentioned samples' surfaces; FIG. 9a shows the structural state of the sample [the above-mentioned sample (2)] before being subjected to the solution heat treatment, and FIG. 9b shows the structural state of the sample [the above-mentioned sample (3)] after being subjected to the solution heat treatment. From these photomicrographs, it becomes clear that almost no second phase particles are observable in the sample (3), i.e., the cladding tube of this embodiment.

Figure 10:
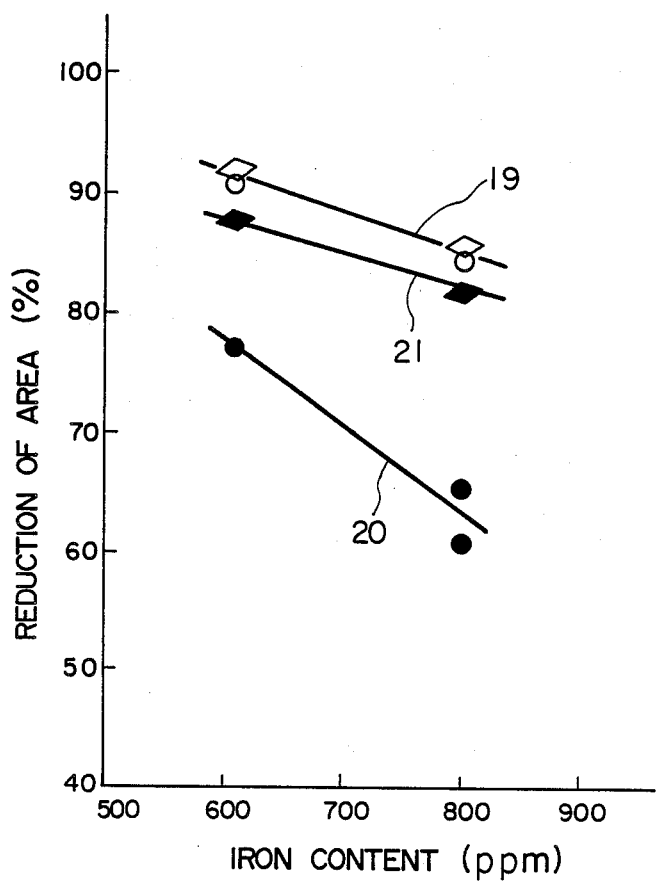
FIG. 10 is a chart showing the relationship between the iron content and the reduction of area.

Additionally, the zirconium plates, which would become the samples, were produced from the zirconium containing impurities, whose composition were shown respectively at Nos. 5 and 6 in Table 5. From respective zirconium plates, the samples subjected to the same solution heat treatment as in the case of the above-mentioned No. 5 and the samples not subjected to such solution heat treatment were prepared. For these four kinds of zirconium plates, the stress corrosion cracking test was carried out on the aforesaid conditions (i), (ii) and (iii). FIG. 10 shows, after arranging the data, the result of this test. It may be said that the smaller the reduction of area is, the higher the stress corrosion cracking susceptibility becomes. From FIG. 10, it will be seen that the stress corrosion cracking susceptibility becomes high with increase in the iron content. This is attributable to the fact that a greater amount of second phase particles, which are intermetallic compounds of iron and zirconium, are formed. However, in FIG. 10, the sample 21 subjected to the solution heat treatment as in this embodiment exhibits a higher reduction of area in comparison with the sample 20 not subjected to such solution heat treatment, and so it has an extremely low stress corrosion cracking susceptibility. Incidentally, the curve 19 represents the reduction of area of the sample 21 tested in an argon atmosphere.

With the nuclear fuel element of this embodiment, the probability of causing the stress corrosion cracking becomes very small.

Next, a description will be made as to the aforementioned measure III.

The present inventors have found that the stress corrosion cracking susceptibility and the local corrosion can be lowered by reducing the second phase particles containing F, Cr, Ni, Sn, etc., which are dispersed in inner surface and/or outer surface of the cladding tube made of a zirconium alloy, the inner surface of which is lined with a zirconium liner.

In general, the portions of the inner and outer surfaces of a cladding tube where the second phase particles appear exhibit high chemical reactivity and stresses tend to be concentrated to such portions when a load is applied to the cladding tube. The studies made by the present inventors proved a fact that the stress corrosion cracking susceptibility is increased as the amount of the second phase particles in the inner surface of the zirconium liner is increased. This may be attributable to the fact that, when the cladding tube is loaded under a corrosive environment, the initiation and propagation of cracks are promoted due to high chemical reactivity and stress concentration around the second phase particles.

On the other hand, it is considered that the second phase particles also trigger the local corrosion (such as nodular corrosion) of the outer surface of the cladding tube due to reaction with water or steam. Namely, it is considered that the local corrosion is attributable to the fact that the second phase particles, which act as electron conductors, promote the corrosive reaction in the areas in the vicinity of the second phase particles.

Since both of the stress corrosion cracking and the local corrosion occur exceedingly from a surface layer of the inner or outer surface of the cladding tube and proceed inwardly, it is necessary that the surface layer's susceptibility to stress corrosion cracking or local corrosion be maintained to a low level at an initial stage. Accordingly, it is also an aim of the invention to lower the surface's susceptibility to stress corrosion cracking or local corrosion by reducing the second phase particles precipitated in the surface portion of the cladding tube.

Preferable embodiments of the invention will be described hereinunder.

Embodiment 4

Figure 11:
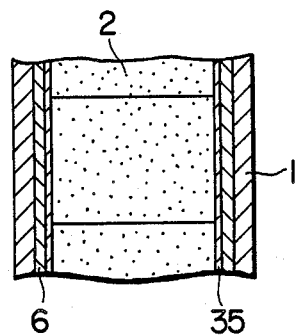
FIG. 11 is a partial, vertical sectional view of a nuclear fuel element for another embodiment of the invention.

The nuclear fuel element of this embodiment is shown in FIG. 11. The nuclear fuel element of this embodiment is almost identical in its construction with that shown in FIG. 3, except that the former's zirconium liner is somewhat different in its construction from the latter's zirconium liner. As shown in FIG. 11, in the nuclear fuel element of this embodiment, the region 35 wherein an amount of the second phase particles is reduced (hereinafter referred to as the particles reduced region 35) is formed in an inner surface side of the zirconium liner 6. The mean distribution density of the second phase particles existing in the precipitate particles reduced region 35 is extremely lower than that of the zirconium liner 6. Namely, the zirconium liner 6 is made of the zirconium containing the impurities, whose composition is shown at No. 2 in Table 4, and the zirconium liner 6 includes the second phase particles containing these impurities. The particles reduced region 35 is a region wherein the amount of the second phase particles is smaller in comparison with the zirconium liner 6. The particles reduced region 35 is formed over the entire inner surface of the zirconium liner 6 and faces the outer surfaces of a plurality of fuel pellets 2. The cladding tube 1 in this embodiment is made of a zirconium alloy having a composition shown in Table 6, i.e., Zircaloy-2. The particles reduced region 35 is obtained by means of electropolishing the inner surface of the zirconium liner 6 provided inside the cladding tube 1 by flowing an ethyl alcohol solution containing aluminum chloride and zinc chloride through the cladding tube 1 in such a manner as mentioned later in relation to the embodiment 7 with reference to FIG. 18.

TABLE 6

| main components (wt. %) | | | | | impurities (ppm) | | | | | |
|---|---|---|---|---|---|---|---|---|---|---|
| Sn | Fe | Cr | Ni | Zr | Al | B | C | Ca | Cd | Cl |
| 1.53 | 0.14 | 0.10 | 0.05 | Bal. | <35 | <0.25 | 170 | <10 | <0.25 | 5 |

| impurities (ppm) | | | | | | | | | | | | |
|---|---|---|---|---|---|---|---|---|---|---|---|---|
| Co | Cu | H | Hf | Mg | Mn | N | O | Pb | Si | Ti | U | W |
| <10 | 12 | 8 | <50 | <10 | <25 | 40 | 1380 | <25 | 59 | <25 | <1.0 | <25 |

Figure 12:
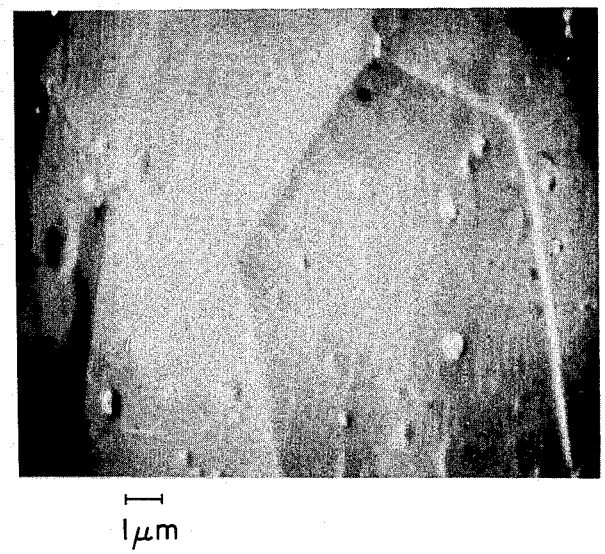
FIG. 12 is a photomicrograph by scanning electron microscope, of an inner surface of a zirconium liner before being electropolished.
Figure 13:
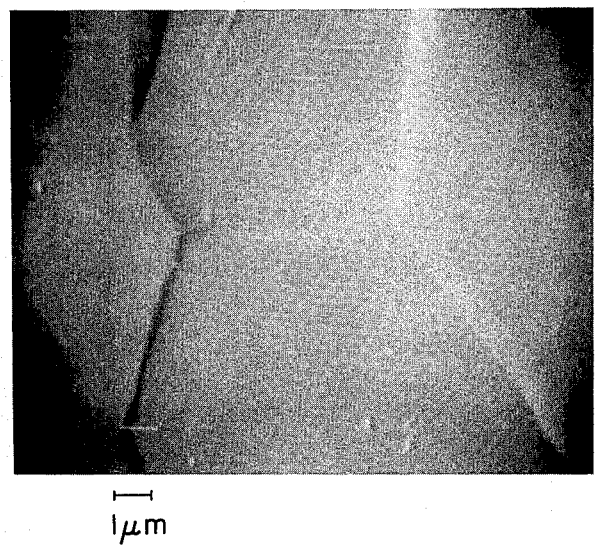
FIG. 13 is a photomicrograph by scanning electron microscope, of an inner surface of a zirconium liner after being electropolished.

FIG. 12 shows a photomicrograph (magnification: about 10,000) by scanning electron microscope, of the inner surface of the zirconium liner 6, and from this photomicrograph a multiplicity of the second phase particles of the size smaller than about 0.5 μm are observable. FIG. 13 shows a photomicrograph (magnification: about 10,000) by scanning electron microscope, of the same portion after being electropolished at a current density of about 10 mA/mm² for 10 seconds in an ethyl alcohol solution containing aluminum chloride and zinc chloride, and from this photomicrograph it became clear that the second phase particles had been removed by the electropolishing in such a degree that almost no particles could be confirmed.

Embodiment 5

Figure 14:
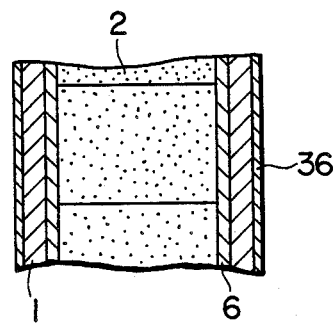
FIG. 14 is a partial, vertical sectional view of a nuclear fuel element for another embodiment of the invention.

The nuclear fuel element of this embodiment is shown in FIG. 14. In this embodiment, the region 36 where amount of the second phase particles is reduced (hereinafter referred to as the particles reduced region 36) is formed in an outer surface side of the cladding tube 1, reversely to the embodiment 4. The number of the second phase particles in the particles reduced region 36 is smaller than that in the cladding tube 1. In the inner surface side of the zirconium liner 6, there exists no particles. The zirconium liner 6 is made of zirconium having the impurity composition shown at No. 2 in Table 4, and the cladding tube 1 is made of Zircaloy-2 having the composition shown in Table 6.

Figure 19:
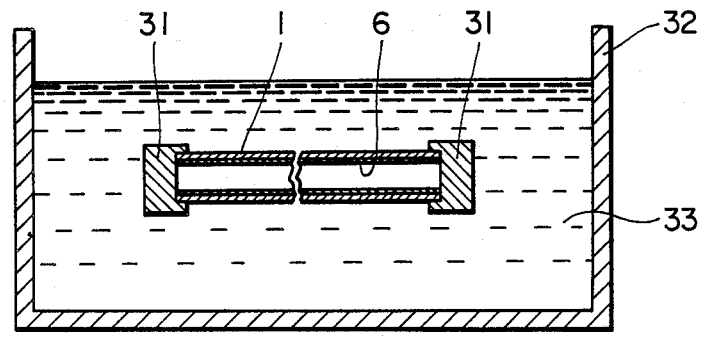

The particles reduced region 36 in the cladding tube's outer surface is obtained by pickling the cladding tube's outer surface in such a manner as mentioned later in relation to the embodiment 7 with reference to FIG. 19. As a pickling liquid, an aqueous solution containing 5 vol. % of hydrofluoric acid and 45 vol. % of nitric acid was used.

FIG. 15 shows a photomicrograph by scanning electron microscope, of the outer surface of the cladding tube 1 made of the Zircaloy-2 (the composition of which is as shown in Table 6), after having been pickled for 20 seconds in the aqueous solution containing 5 vol. % of hydrofluoric acid and 45 vol. % of nitric acid. Although the mean number of the second phase particles per a surface area of 1 mm² is about 2×10⁵ in this case, when the outer surface is pickled for 2 minutes in the aqueous solution containing the above-mentioned acids the number of the second phase particles existing therein is very small. Namely, the mean number of the second phase particles in the outer surface portion (i.e., the particles reduced region 36) of the cladding tube 1 after having been pickled was reduced to about 1/10 of that in a portion of the cladding tube 1 inside the region 36.

Embodiment 6

In the nuclear fuel element of this embodiment, zirconium containing 800 ppm of iron (i.e., the zirconium having impurity composition shown at No. 5 in Table 5) is used as a blank material of the zirconium liner 6 in the nuclear fuel element of the embodiment 4. In the inner surface side of the zirconium liner 6 of this embodiment, there is formed the particles reduced region 35 similarly to the embodiment 4. This particles reduced region 35 is obtained by electropolishing with an ethyl alcohol solution mentioned later.

When the inner surface of such zirconium liner 6 containing 800 ppm of iron as an impurity was microscopically observed at a magnification of about 10,000, a multiplicity of the second phase particles of size smaller than about 2 μm were detected; and after these particles were analyzed by an X-ray microanalyzer (XMA) and electron beam diffraction, it was identified that they were intermetallic compounds of zirconium and iron. By electropolishing the inner surface of this zirconium liner 6 in the ethyl alcohol solution containing aluminum chloride and zinc chloride at a current density of 20 mA/mm² for 10 seconds similarly to the embodiment 4, it became that no particles were confirmed when observed at a magnification of about 10,000. Namely, it was possible to remove the impurity iron existing as the second phase particles in the zirconium liner 6 by the electropolishing.

Embodiment 7

Figure 17:
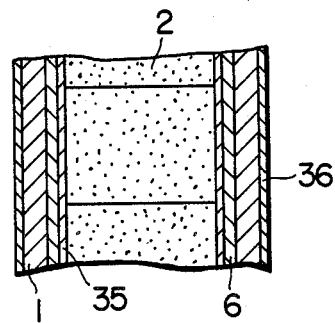
FIG. 17 is a partial, vertical sectional view of a nuclear fuel element for another embodiment of the invention.

The nuclear fuel element of this embodiment has, as shown in FIG. 17, the particles reduced regions 35 and 36 mentioned in the embodiments 5 and 6. The materials of the cladding tube 1 and the zirconium liner 6 are identical with those in the embodiment 6. The particles reduced regions 35 and 36 are respectively positioned in the inner surface side of the zirconium liner 6 and in the outer surface side of the cladding tube 1.

Figure 18:
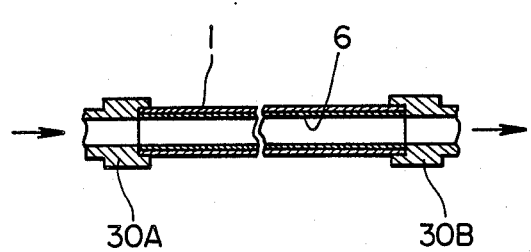
FIGS. 18 and 19 are explanatory views of processes for separately pickling an inner surface of a zirconium liner and an outer surface of a cladding tube made of Zircaloy-2.

The zirconium-lined cladding tube used in the nuclear fuel assembly of this embodiment is produced in such a manner as mentioned hereinunder. Namely, the zirconium-lined cladding tube 1 made of Zircaloy-2 (the composition of which is as shown in Table 6) such as shown in FIG. 3 and having the zirconium liner 6 containing 800 ppm of iron as an impurity was prepared, and both ends of the cladding tube 1 were connected, as shown in FIG. 18, to polyethylene tubes 30A and 30B; and by flowing an aqueous solution containing 5 vol. % of hydrofluoric acid and 45 vol. % of nitric acid through the cladding tube for 2 minutes as indicated with arrow marks, the inner surface of zirconium liner 6 was firstly pickled. Then, as shown in FIG. 19, after closing both ends of the cladding tube with polyethylene plugs 31, the cladding tube was immersed in the above-mentioned aqueous solution 33 in a vessel 32 for 2 minutes, thus pickling the outer surface of the cladding tube. Further, after each pickling, the cladding tube was rinsed with water to completely get rid of the aqueous solution. By the picklings mentioned above, it was made possible to reduce the number of the second phase particles in the inner surface portion (i.e., the particles reduced region 35) of the zirconium liner 6 to less than about 1/10 of that in a portion of the zirconium liner 6 other than the region 35 and, further, to reduce the number of the second phase particles in the outer surface portion (i.e., the particles reduced region 36) of the cladding tube 1 to less than about 1/10 of that in a portion of the cladding tube 1 other than the region 36.

Here, a concept "ratio of reduction of area" was assumed as an index for the evaluation of stress corrosion cracking susceptibility. More specifically, the samples of cladding tubes were subjected to uniaxial tensile tests in an iodine atmosphere and an argon atmosphere. Representing the reduction of area at ductile rupture in argon atmosphere by $E_1$ and the reduction of area at rupture in iodine atmosphere by $E_2$, the ratio expressed by $(E_1-E_2)/E_1$ was determined as the stress corrosion cracking susceptibility index. Thus, the smaller value of this index represents a lower stress corrosion cracking susceptibility, i.e., a higher resistance to stress corrosion cracking. FIG. 20 shows the stress corrosion cracking susceptibility indices as observed with zirconium having impurity contents of 2000 ppm and 1500 ppm, respectively before and after the removal of precipitates by the electropolishing explained in the embodiment 4. More specifically, in FIG. 20, symbols E and F show the indices of the zirconium having the impurity content of 2000 ppm, before and after the removal of precipitates, respectively, while G and H show the indices of the zirconium having the impurity content of 500 ppm, before and after the removal of the precipitates, respectively. In the case of the zirconium containing about 2000 ppm of impurity, the stress corrosion cracking susceptibility index, which was 0.25 in the state before the removal of precipitates, was reduced to 0.10 as a result of the removal of the precipitates. Similarly, in the case of the zirconium having the impurity content of about 1500 ppm, the stress corrosion cracking susceptibility was reduced from 0.15 to 0.05, as a result of removal of the precipitates. It is thus possible to remarkably reduce the stress corrosion cracking susceptibility by removing the second phase particles existing in the surface layer.

Further, a zirconium containing 800 ppm of iron as an impurity (the zirconium shown at No. 5 in Table 5) and a zirconium containing 610 ppm of iron (the zirconium shown at No. 6 in Table 5) were subjected to a uni-axial tensile test in an iodine gas atmosphere. The test proved a fact that the zirconium having greater iron content causes the stress corrosion cracking with smaller elongation. This means that the iron as an impurity increases the stress corrosion cracking susceptibility. The zirconium having the iron content of 800 ppm was subjected to an electropolishing in the same way as explained before in the embodiment 6 to remove the iron-containing particles on the zirconium surface. The zirconium thus got rid of particles was subjected to a uni-axial tensile test in an iodine gas atmosphere, and it was confirmed that an elongation till rupture of this zirconium was greater than that of the zirconium having a lower iron content of 610 ppm. Namely, the susceptibility to stress corrosion cracking could be extremely lowered by removing the iron-containing particles precipitated in the zirconium surface.

As mentioned above, it becomes possible to extremely lower the susceptibility to the stress corrosion cracking by removing or decreasing the second phase particles in the inner surface of the cladding tube, and so a sufficiently high effect of preventing the stress corrosion cracking can be obtained even when a low-priced zirconium having a somewhat low purity is used for the zirconium liner 6. Further, the local corrosion of the outer surface of the cladding tube during the long use can also be remarkably suppressed and so the reliability of the nuclear fuel element can be improved, by removing the second phase particles which are considered to have a strong influence on the local corrosion.

Incidentally, the invention aims at removing the second phase particles in the surface of the cladding tube, but the methods therefor are not limited to those explained in the aforementioned embodiments, and it is possible to execute the invention by suitably conducting a chemical or electrochemical surface treatment. Further, even when the particles are removed not perfectly it is possible, by reducing the amount thereof, to suppress the stress corrosion cracking at initial stage which occurs in probability relationship in the surface layer or to lower the probability of occurrence for the local corrosion, thereby bringing about an effect of improving the cladding tube.

Further, since the stress corrosion cracking and the local corrosion are phenomena which occur in probability relationship from the portions wherein the second phase particles exist, it is effective to reduce the amount of the second phase particles even though they are not perfectly removed, and so a sufficient improving effect can be obtained by reducing the materially observable particles to less than 50% in terms of volumetric ratio or less than 1/10 in terms of number of particles.

As has been described, according to the invention, it is possible to suppress the occurrence of stress corrosion cracking in the cladding tube and, therefore, to obtain a highly durable and reliable nuclear fuel element by using this cladding tube.

What is claimed is:

1. A cladding tube for nuclear fuel comprising an inner zirconium liner layer and an outer zirconium alloy layer, characterized in that said inner zirconium liner layer contains iron and oxygen as impurities, and that the ratio a/b of the oxygen content a to the iron content b in said zirconium liner layer is greater that 1.0 so as to provide a liner layer having both decreased stress corrosion cracking susceptibility and increased mechanical strength as compared to liner layer of zirconium in which said ratio is not greater that 1.0.

2. A cladding tube for nuclear fuel as claimed in claim 1, consisting of said inner zirconium liner layer and said outer zirconium alloy layer.

3. A cladding tube for nuclear fuel as claimed in claim 1, wherein said inner zirconium liner layer consists of zirconium with oxygen and iron, and other impurities.

4. A cladding tube for nuclear fuel as claimed in claim 1, wherein said inner zirconium liner layer is positioned directly on the outer zirconium alloy layer.

5. A cladding tube for nuclear fuel comprising an inner zirconium liner layer and an outer zirconium alloy layer, characterized in that said inner zirconium liner layer contains iron and oxygen as impurities, that the ratio a/b of the oxygen content a to the iron content b in said zirconium liner layer is greater that 1.0 so as to provide a liner layer having both decreased stress corrosion cracking susceptibility and increased mechanical strength as compared to liner layers of zirconium in which said ratio is not greater that 1.0; and that a material of said zirconium liner layer is a matrix of zirconium into which matrix impurities are dissolved.

6. A cladding tube for nuclear fuel as claimed in claim 2, wherein said impurities are elements, selected from the group consisting of Fe, Cr, Ni, Si, W, C, O, Hf, H, N, and Al, which form intermetallic compounds with zirconium.

7. A cladding tube for nuclear fuel as claimed in claim 5, wherein said inner zirconium liner layer is positioned directly on the outer zirconium alloy layer.

8. A cladding tube for nuclear fuel comprising an inner zirconium liner layer and an outer zirconium alloy layer, characterized in that said inner zirconium liner layer contains iron and oxygen as impurities, that the ratio a/b of the oxygen content a to the iron content b in said zirconium liner layer is greater that 1.0 so as to provide a liner layer having both decreased stress corrosion cracking susceptibility and increased mechanical strength as compared to liner layers of zirconium in which said ratio is not greater that 1.0; that a mean distribution density of the second phase particles, which are containing Fe or Ni or Cr, in an inside portion of said zirconium liner layer is smaller than that of an outside portion of said zirconium liner layer; and that a mean distribution density of the second phase particles, which are containing Fe or Ni or Cr or Sn, in an outside portion of said zirconium alloy layer is smaller than that of an inside portion of said zirconium alloy layer.

9. A cladding tube for nuclear fuel as claimed in claim 8, wherein said inner zirconium liner layer is positioned directly on the outer zirconium alloy layer.

10. A cladding tube for nuclear fuel as claimed in claim 8, wherein Fe or Ni or Cr contained in second phase particles in the zirconium liner layer are impurities in the liner layer, and wherein Fe or Ni or Cr or Sn contained in the second phase particles in the zirconium alloy layer are impurities contained in the zirconium alloy layer.

11. A cladding tube for nuclear fuel as claimed in claim 8, wherein the number density of the second phase particles in an inside portion of said zirconium liner layer is 1/10 that of an outside portion of said zirconium liner layer.

12. A cladding tube for nuclear fuel as claimed in claim 11, wherein the number density of the second phase particles in an outside portion of said zirconium alloy layer is 1/10 that of an inside portion of said zirconium alloy layer.

13. A nuclear fuel element comprising a cladding tube including an inner zirconium liner layer and an outer zirconium alloy layer, a plurality of fuel pellets charged in said cladding tube and plugs sealing both ends of said cladding tube, characterized in that said inner zirconium liner layer contains iron and oxygen as impurities, and that the ratio a/b of the oxygen content a to the iron content b in said zirconium liner layer is greater that 1.0 so as to provide a liner layer having both decreased stress corrosion cracking susceptibility and increased mechanical strength as compared to liner layers of zirconium in which said ratio is not greater than 1.0.

14. A nuclear fuel element as claimed in claim 13, wherein said inner zirconium liner layer is positioned directly on said outer zirconium alloy layer.

15. A nuclear fuel element comprising a cladding tube including an inner zirconium liner layer and an outer zirconium alloy layer, a plurality of fuel pellets charged in said cladding tube and plugs sealing both ends of said cladding tube, characterized in that said inner zirconium liner layer contains iron and oxygen as impurities, that the ratio a/b of the oxygen content a to the iron content b in said zirconium liner layer is greater that 1.0 so as to provide a liner layer having both decreased stress corrosion cracking susceptibility and increased mechanical strength as compared to liner layers of zirconium in which said ratio is not greater that 1.0; and that a material of said zirconium liner layer is a matrix of zirconium into which matrix impurities are dissolved.

16. A nuclear fuel element as claimed in claim 15, wherein said inner zirconium liner layer is positioned directly on said outer zirconium alloy layer.

17. A nuclear fuel element comprising a cladding tube including an inner zirconium liner layer and an outer zirconium alloy layer, a plurality of fuel pellets charged in said cladding tube and plugs sealing both ends of said cladding tube, characterized in that said inner zirconium liner layer contains iron and oxygen as impurities, that the ratio a/b of the oxygen content a to the iron content b in said zirconium liner layer is greater that 1.0 so as to provide a liner layer having both decreased stress corrosion cracking susceptibility and increased mechanical strength as compared to liner layers of zirconium in which said ratio is not greater that 1.0; that a mean distribution density of the second phase particles, which are containing Fe or Ni or Cr, in an inside portion of said zirconium liner layer is smaller than that of an outside portion of said zirconium liner layer; and that a mean distribution density of the second phase particles; which are containing Fe or Ni or Cr or Sn, in an outside portion of said zirconium alloy layer is smaller than that of an inside portion of said zirconium alloy layer.

18. A nuclear fuel element as claimed in claim 17, wherein said inner zirconium liner layer is positioned directly on said outer zirconium alloy layer.

19. A nuclear fuel element as claimed in claim 17, wherein Fe or Ni or Cr contained in second phase particles in the zirconium liner layer are impurities in the liner layer, and wherein Fe or Ni or Cr or Sn contained in the second phase particles in the zirconium alloy layer are impurities contained in the zirconium alloy layer.

20. A cladding tube for nuclear fuel comprising an inner zirconium liner layer and an outer zirconium alloy layer, characterized in that said inner zirconium liner layer contains iron and oxygen as impurities, that the ratio a/b of the oxygen content a to the iron content b in said zirconium liner layer is greater that 1.0 so as to provide a liner layer having both decreased stress corrosion cracking susceptibility and increased mechanical strength as compared to liner layers of zirconium in which said ratio is not greater that 1.0; that a mean distribution density of the second phase particles, which are containing Fe or Ni or Cr, in an inside portion of said zirconium liner layer is smaller than that of an outside portion of said zirconium liner layer; or that a mean distribution density of the second phase particles, which are containing Fe or Ni or Cr or Sn, in an outside portion of said zirconium alloy layer is smaller than that of an inside portion of said zirconium alloy layer.

21. A nuclear fuel element comprising a cladding tube including an inner zirconium liner layer and an outer zirconium alloy layer, a plurality of fuel pellets charged in said cladding tube and plugs sealing both ends of said cladding tube, characterized in that said inner zirconium liner layer contains iron and oxygen as impurities, and that the ratio a/b of the oxygen content a to the iron content b in said zirconium liner layer is greater that 1.0 so as to provide a liner layer having both decreased stress corrosion cracking susceptibility and increased mechanical strength as compared to liner layers of zirconium in which said ratio is not greater that 1.0; and that a mean distribution density of the second phase particles, which are containing Fe or Ni or Cr, in an inside portion of said zirconium liner layer is smaller than that of an outside portion of said zirconium liner layer, or that a mean distribution density of the second phase particles, which are containing Fe or Ni or Cr or Sn, in an outside portion of said zirconium alloy layer is smaller than that of an inside portion of said zirconium alloy layer.

* * * * *